March 10, 1970      R. E. MENTZER      3,500,201

EXTENDED RANGE METER HAVING MOVING MAGNET

Filed Oct. 18, 1965

INVENTOR.
ROBERT E. MENTZER

BY Fordyce A. Bothwell

ATTORNEY

United States Patent Office 3,500,201
Patented Mar. 10, 1970

3,500,201
EXTENDED RANGE METER HAVING
MOVING MAGNET
Robert E. Mentzer, Southampton, Pa., assignor to Philco-Ford Corporation, Philadelphia, Pa., a corporation of Delaware
Filed Oct. 18, 1965, Ser. No. 496,762
Int. Cl. G01r 1/20, 11/02
U.S. Cl. 324—146      4 Claims

ABSTRACT OF THE DISCLOSURE

An extended range meter comprising a rotatable permanent magnet element, a first coil connected across a pair of terminals, and a series circuit including second and third coils and a Zener diode, connected in shunt with the first coil. The second coil is disposed in 90° relation to the first coil and the third coil is wound so that its magnetic flux opposes that of the first coil. When the voltage applied across the terminals is less than the breakdown voltage of the Zener diode, the Zener diode inhibits current flow in the series circuit and only the first coil is energized to rotate the permanent magnet element of the meter. When the voltage applied across the terminals equals or exceeds the breakdown voltage of the Zener diode, the diode becomes conductive and current flows through the second and third coils. Because the magnetic flux developed by the third coil bucks that developed by the first coil, the permanent magnet element is rotated primarily or entirely by the flux developed by the second coil. Because the second coil is disposed at right angles to the first coil, its flux may turn the magnet element through angles through which the flux of the first coil cannot turn it, thereby extending the range of the meter beyond the range attainable by use of only the first coil.

In the conventional low cost meter a bar magnet is actuated by a coil, and while a deflection range of 180° is theoretically possible, commercial meters of this type generally have a deflection range of only about 70°. Prior proposals to extend the range of such meters have not been entirely satisfactory. In general, either they have failed to provide substantial extension of the range or they have only succeeded in doing so at prohibitive cost.

The principle object of the present invention is to provide the desired range extension at relatively low cost.

In accordance with this invention an arrangement is provided whereby the permanent magnet element is actuated by a first coil in response to applied voltages of amplitude lower than a predetermined level, and said element is actuated by a second coil in response to applied voltages of amplitude equal to or greater than said level. More particularly a meter constructed according to the preferred form of the present invention comprises a first coil connected across two terminals to which said voltages are applied, a circuit connected in shunt relation to said first coil, a second coil connected in said shunt circuit and disposed in angular relation to said first coil, a device such as a Zener diode connected in said shunt circuit to inhibit current flow therein until a voltage of amplitude equal to or greater than said level is applied to said terminals, and a third coil connected in said shunt circuit and arranged in opposed relation to said first coil so that when current flows in said shunt circuit the third coil reduces the effectiveness of the first coil and thus enables the second coil to actuate the magnet.

Figure 1:
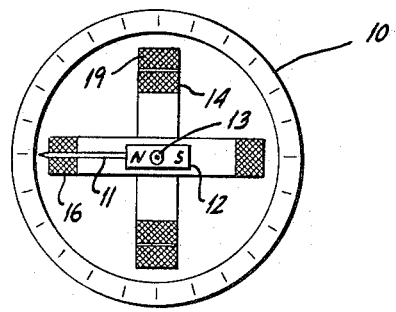
Figure 2:
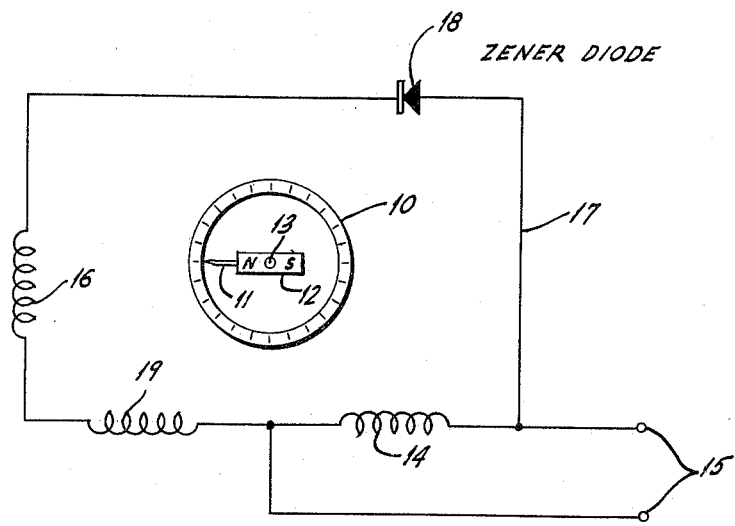

The invention may be fully understood from the following detailed description with reference to the accompanying drawing wherein:

FIG. 1 is a schematic illustration of the mechanical structure of a meter according to the present invention; and FIG. 2 is a schematic illustration of the electrical structure of said meter.

Referring more particularly to the drawing, the meter scale is represented at 10 and the indicator or pointer associated therewith is shown at 11. The latter is carried by a permanent bar magnet 12 which is mounted for rotation about an axis 13. A first coil 14 is connected to meter input terminals 15 and is disposed in proximity to magnet 12 for actuation thereof in response to a voltage applied to terminals 15. A second coil 16 is disposed in angular relation to coil 14, for example in 90° relation thereto as shown, in proximity to magnet 12 for actuation of the latter. Coil 16 is connected in a circuit 17 which is connected in shunt relation to coil 14. Also connected in said shunt circuit are a Zener diode 18 and a third coil 19 which is coaxial with coil 14 and is wound so that its magnetic flux opposes that of coil 14.

In operation the Zener diode 18 inhibits current flow in the shunt circuit 17 until such time as the voltage applied to terminals 15 reaches an amplitude level corresponding to the Zener voltage of the diode. As long as the applied voltage is below said level, only coil 14 is effective and its magnetic flux may actuate magnet 12 and hence pointer 11 through a range of 180°. However when the applied voltage reaches said amplitude level, diode 18 conducts and current flows through the shunt circuit 17. Since the magnetic flux of coil 19 opposes that of coil 14, the effectiveness of the latter coil is reduced. When the flux of coil 19 equal that of coil 14, coil 16 alone is effective and its magnetic flux may actuate magnet 12 and pointer 11 through an additional 90°.

Thus the present invention provides a simple arrangement for extending the range of a moving magnet type meter. In the embodiment shown coil 16 is disposed in 90° relation to coil 14. However by reducing the angle between said coils and/or by winding coil 19 so that its opposing flux exceeds that of coil 14, even greater extension of the range is possible.

It will also be apparent that the Zener diode 18 may be replaced by any other suitable device which will limit the flow of current in the shunt circuit until the signal applied at terminals 15 reaches a predetermined amplitude.

While a preferred embodiment of the invention has been illustrated and described, it will be understood that the invention is not limited thereto but contemplates such modifications and further embodiments as may occur to those skilled in the art.

I claim:

1. In a moving magnet electric meter responsive to a voltage applied between two terminals thereof to produce an indication dependent upon the value of said voltage, a rotatable permanent magnet element, a first coil connected across said terminals, a series circuit connected in shunt relation to said first coil and comprising a second coil, a third coil, and a device having a non-linear voltage-current characteristic, said device being poled such that it inhibits current flow in said series circuit until the voltage applied across said series circuit reaches a certain value, said first coil producing when an electric current is passed therethrough a magnetic field that extends along a first magnetic axis, said second coil producing when an electric current is passed therethrough a magnetic field that extends along a second magnetic axis, said third coil producing when an electric current is passed therethrough a magnetic field in opposing relation to the magnetic field produced by said first coil, thereby to reduce the effect on said permanent magnet element of said magnetic field produced by said first coil, when current flows in said series circuit, and said three coils and said magnet element being disposed so that said magnet element is within the magnetic fields produced by said three coils.

2. An electric meter according to claim 1, wherein said device is a Zener diode.

3. An electric meter according to claim 1, wherein said second coil is disposed in 90° relation to said first coil.

4. An electric meter according to claim 3, wherein said device is a Zener diode.

References Cited

UNITED STATES PATENTS

| 2,057,845 | 10/1936 | Pattee | 324—146 |
| 2,981,888 | 4/1961 | White | 324—115 |
| 3,031,620 | 4/1962 | Finley | 324—131 |
| 3,168,689 | 2/1965 | Gelenius | 324—146 X |
| 3,183,412 | 5/1965 | Arends | 317—123 |

ALFRED E. SMITH, Primary Examiner

U.S. Cl. X.R.

324—132, 143